(12) United States Patent
Ezrielev et al.

(10) Patent No.: US 12,306,935 B2
(45) Date of Patent: May 20, 2025

(54) SYSTEM AND METHOD FOR DETECTING MALICIOUS ATTACKS TARGETING ARTIFICIAL INTELLIGENCE MODELS

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/147,761

(22) Filed: Dec. 29, 2022

(65) Prior Publication Data

US 2024/0220607 A1    Jul. 4, 2024

(51) Int. Cl.
*G06F 21/55*    (2013.01)

(52) U.S. Cl.
CPC .................................. *G06F 21/55* (2013.01)

(58) Field of Classification Search
CPC ...................................................... G06F 21/55
See application file for complete search history.

(56) References Cited

U.S. PATENT DOCUMENTS

| | | |
|---|---|---|
| 10,936,969 B2 | 3/2021 | Patel et al. |
| 11,087,170 B2 | 8/2021 | Malaya |
| 11,487,963 B2 | 11/2022 | Angel |
| 11,544,501 B2 | 1/2023 | Dong |
| 11,636,726 B2 | 4/2023 | Purohit |
| 11,645,515 B2 | 5/2023 | Angel |
| 11,785,024 B2 | 10/2023 | Karam |
| 11,797,672 B1 | 10/2023 | Beveridge |

(Continued)

FOREIGN PATENT DOCUMENTS

| | | |
|---|---|---|
| WO | 2020040777 A1 | 2/2020 |
| WO | 2021213626 A1 | 10/2021 |

(Continued)

OTHER PUBLICATIONS

Anastasovski, Goce, "Classification of Malicious Web Traffic" (2013), Graduate Theses, Dissertations, and Problem Reports 153 (118 Pages).

(Continued)

*Primary Examiner* — Bradley W Holder
(74) *Attorney, Agent, or Firm* — WOMBLE BOND DICKINSON (US) LLP

(57) ABSTRACT

Methods and systems for detecting malicious attacks targeting an artificial intelligence (AI) model are disclosed. To detect malicious attacks targeting an AI model, data sets and data sources from which the data sets are obtained may be analyzed. A severity level of risk associated with using the data set to re-train the AI model may be obtained. If the severity level of risk exceeds a re-training risk threshold, the data set may not be used to re-train the AI model. To reduce the likelihood of generating tainted inferences that may significantly impact operation of a downstream consumer, a magnitude of impact of potential inferences derived from the data set may be obtained. If the magnitude of impact of potential inferences derived from the data set exceeds a magnitude threshold, the data set may be discarded without generating any inferences.

20 Claims, 10 Drawing Sheets

(56) References Cited

U.S. PATENT DOCUMENTS

| | | | |
|---|---|---|---|
| 11,829,193 | B2 | 11/2023 | Shukla |
| 11,847,217 | B2 | 12/2023 | Healy |
| 11,921,903 | B1 | 3/2024 | Beveridge |
| 12,032,541 | B2 | 7/2024 | Hasabnis |
| 12,126,640 | B2 | 10/2024 | Woodworth |
| 12,143,405 | B2 | 11/2024 | Chen Kaidi |
| 2017/0177860 | A1* | 6/2017 | Suarez .................. G06F 21/53 |
| 2018/0255023 | A1 | 9/2018 | Whaley |
| 2019/0377873 | A1* | 12/2019 | Murphy .............. H04L 63/1441 |
| 2020/0050945 | A1* | 2/2020 | Chen .................... G06F 18/214 |
| 2020/0082097 | A1 | 3/2020 | Poliakov |
| 2020/0082270 | A1 | 3/2020 | Gu |
| 2021/0073685 | A1 | 3/2021 | Veshchikov |
| 2021/0081831 | A1* | 3/2021 | Angel .................... G06N 20/00 |
| 2021/0209512 | A1 | 7/2021 | Gaddam et al. |
| 2021/0303695 | A1 | 9/2021 | Grosse |
| 2021/0374247 | A1 | 12/2021 | Sultana |
| 2021/0398020 | A1 | 12/2021 | Ahmad et al. |
| 2022/0179840 | A1 | 6/2022 | Chatterjee |
| 2022/0414492 | A1 | 12/2022 | Jezewski |
| 2023/0079112 | A1 | 3/2023 | Cheruvu |
| 2023/0148116 | A1 | 5/2023 | Stokes, III |
| 2023/0164162 | A1 | 5/2023 | Lee |
| 2023/0222385 | A1 | 7/2023 | Shimizu |
| 2023/0274003 | A1 | 8/2023 | Liu |
| 2023/0274192 | A1 | 8/2023 | Wang |
| 2024/0015019 | A1 | 1/2024 | Sneider |
| 2024/0119153 | A1 | 4/2024 | Ludmir |
| 2024/0364534 | A1 | 10/2024 | Ezrielev |
| 2025/0055762 | A1 | 2/2025 | Walker |

FOREIGN PATENT DOCUMENTS

| | | |
|---|---|---|
| WO | 2022/216142 A1 | 10/2022 |
| WO | 2023/111287 A1 | 6/2023 |

OTHER PUBLICATIONS

Joshi, Naveen, "Is The Data Used For Training Your Machine Learning Model Safe?", Technology For You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data You Don't Need: Removing Redundant Samples", Towards Data Science, Mar. 19, 2020, <https://towardsdatascience.com/the-data-you-don-t-need-removing-redundant-samples-6bfd07c1516c> (10 Pages).

Paduraru, Ciprian, Marius-Constantin Melemciuc, and Bogdan Ghimis. "Fuzz Testing with Dynamic Taint Analysis based Tools for Faster Code Coverage." ICSOFT 19 (2019): 82-93. (Year: 2019).

Jiang, Bingchen, and Zhao Li. "Defending Against Backdoor Attack on Graph Nerual Network by Explainability." arXiv preprint arXiv: 2209.02902, 10 pages, (Year: 2022).

Raghavan, Vijay, Thomas Mazzuchi, and Shahram Sarkani. "Discover Artificial Intelligence: An improved real time detection of data poisoning attacks in deep learning vision systems", 17 pages, Discover 2022, (Year: 2022).

\* cited by examiner

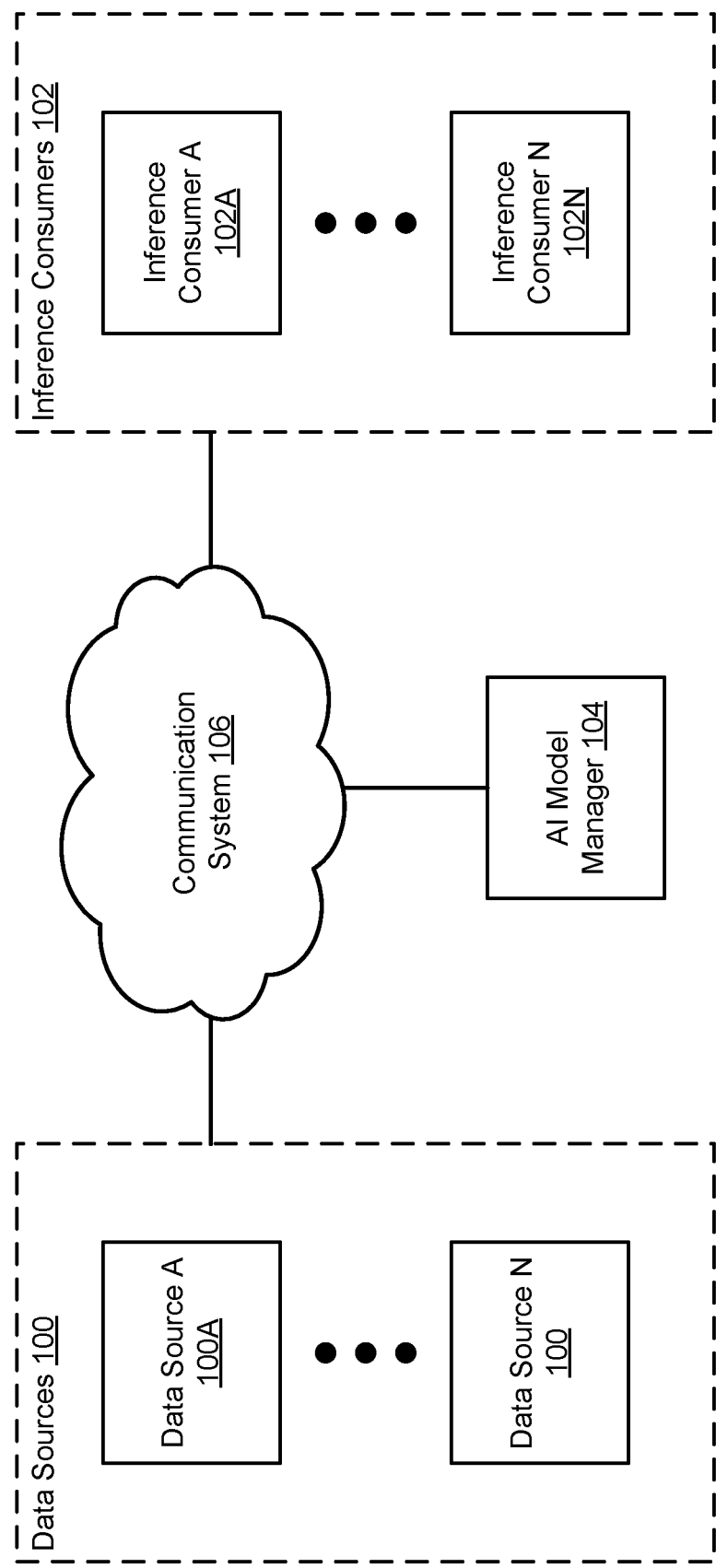

_US 12,306,935 B2_

SYSTEM AND METHOD FOR DETECTING MALICIOUS ATTACKS TARGETING ARTIFICIAL INTELLIGENCE MODELS

FIELD

Embodiments disclosed herein relate generally to artificial intelligence (AI) models. More particularly, embodiments disclosed herein relate to systems and methods to detect malicious attacks targeting AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
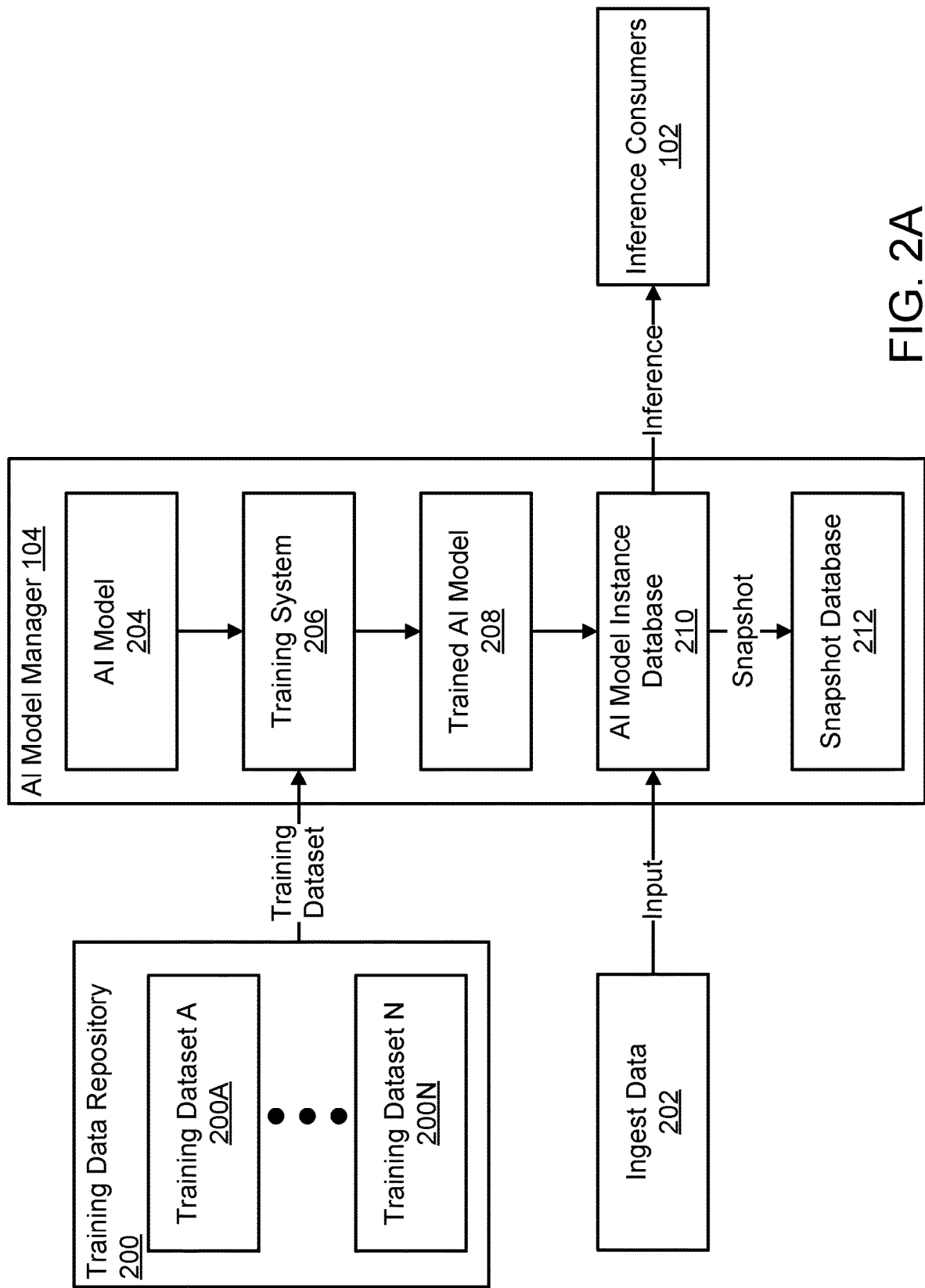
FIG. 2A shows a data flow diagram illustrating an AI model management system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing an AI model. A trained AI model may provide computer-implemented services (e.g., inference generation) for downstream consumers (e.g., inference consumers). To manage the trained AI model, a data processing system may, over time, update the AI model through training using training data. However, if poisoned training data is introduced to the AI model, the AI model may become untrustworthy (e.g., the AI model may be tainted by the poisoned training data). Inferences generated using the tainted AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training the AI model may interrupt inference consumption and/or other types of computer-implemented services that may otherwise be provided using the computing resources dedicated to re-training.

Once the AI model is re-trained, any and/or all inferences provided to inference consumers using the tainted AI model may require replacement. Inference generation may be required for an entire ingest dataset, prompting another inefficient use of computing resources.

To avoid the computing resource expenditure and potential AI model downtime caused by re-training the AI model, data sets intended to be used as training data to re-train the AI model may be analyzed to detect poisoned training data prior to re-training. To do so, a risk analysis may be performed using the data set obtained from a data source. The risk analysis may generate a result and the result may indicate (i) a severity level of risk associated with the data set, and (ii) a magnitude of impact of potential inferences derived from the data set. The severity level of risk may be based, at least in part, on the location of the data source (e.g., a network location, a physical location, etc.). The magnitude of impact of potential inferences derived from the data set may be based, at least in part, on a confidence score associated with inferences generated using the data set.

If the severity level of risk exceeds a re-training risk threshold, the likelihood that the data set is poisoned may be too high and the AI model may not be re-trained. In response to the severity level of risk exceeding the re-training risk threshold, an action set may be performed. The action set may include determining whether inferences generated using the data set should be provided to a downstream consumer. To do so, the severity level of risk may be compared to an inference risk threshold. If the severity level of risk exceeds the inference risk threshold, the data set may be considered too suspicious for inference generation and the data set may be discarded. If the severity level of risk does not exceed the inference risk threshold, the magnitude of impact of potential inferences derived from the data set may be evaluated. If the magnitude of impact of potential inferences derived from the data set exceeds a magnitude threshold, an authentication of the data source may be performed.

To perform the authentication of the data source, an authentication factor may be requested from the data source. Authentication factors may also be requested for data sets that do not have a magnitude of impact of potential inferences derived from the data set that exceeds the magnitude threshold. Doing so may prevent potential malicious attackers from learning patterns related to the re-training of the AI model. If the data source is successfully authenticated, the data set may be utilized to generate inferences and the inferences may be provided to the downstream consumer.

By doing so, attempts to interfere with the operation of AI model (via re-training with poisoned training data) may be detected and intercepted. As a result, the additional computing resource expenditure and AI model downtime associated with re-training a poisoned AI model and replacing poisoned inferences may be avoided.

In the event that poisoned training data is not successfully detected prior to re-training the AI model using the poisoned training data, steps may be taken to reduce computing resources spent re-training the AI models. To do so, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

The snapshot may also store information regarding poisoned inferences obtained from the tainted AI model. This information may be used to identify and/or replace the poisoned inferences already provided to the inference consumer. By identifying the poisoned inferences, only a portion of the ingest dataset may be required to generate replacement inferences.

By doing so, embodiments disclosed herein may provide a system for managing AI models in which the introduction of poisoned training data may be computationally efficiently mitigated. By obtaining periodic snapshots of an evolving AI model (e.g., an AI model that is updated with new training data over time), the computational resources typically associated with repairing a tainted AI model may be reduced, leaving more resources for inference generation.

In an embodiment, a method of detecting malicious attacks targeting an artificial intelligence (AI) model is provided. The method may include: making an identification that a re-training condition is met for the AI model; in response to the identification, performing a risk analysis based on a data set obtained from a data source to obtain a result; making a first determination regarding whether to re-train the AI model using the data set based on the result; and in an instance of the first determination in which the AI model is not to be re-trained using the data set: performing an action set based on: a severity level of risk indicated by the result; and a magnitude of impact of potential inferences derived from the data set indicated by the result.

Performing the risk analysis may include: identifying a location of the data source and a historical data pattern associated with the data source; obtaining, based on the location and the historical data pattern, the severity level of risk; and obtaining the result based, at least in part, on the severity level of risk.

Making the first determination may include: making a first comparison of the severity level of risk to a re-training risk threshold; in a first instance of the first comparison where the severity level of risk exceeds the re-training risk threshold, electing not to re-train the AI model using the data set; and in a second instance of the first comparison where the severity level of risk does not exceed the re-training risk threshold, electing to re-train the AI model using the data set.

Obtaining the severity level of risk may include: making a classification of the location as one selected from a group consisting of: a known trustworthy location; an unknown location; and a known untrustworthy location.

Obtaining the severity level of risk may also include: in an instance of the classification where the location is the known trustworthy location: making a second comparison of the data set to the historical data pattern; and in an instance of the second comparison where the data set is in disagreement with the historical data pattern: increasing the severity level of the risk.

Performing the action set may include: making a second determination regarding whether the severity level of risk exceeds an inference risk threshold; and in a first instance of the second determination where the severity level of risk exceeds the inference risk threshold: discarding the data set without generating any inferences.

Performing the action set may also include: in a second instance of the second determination where the severity level of risk does not exceed the inference risk threshold: making a third determination regarding whether the magnitude of impact of potential inferences derived from the data set exceeds a magnitude threshold; in a first instance of the third determination in which the magnitude of impact of potential inferences derived from the data set exceeds the magnitude threshold: making a verification attempt for the data source; in a first instance of the verification attempt in which the data source is verified: generating an inference using the data set; and in a second instance of the verification attempt in which the data source is not verified: discarding the data set without generating any inferences.

Performing the action set may also include: in a second instance of the third determination in which the magnitude of impact of potential inferences derived from the data set does not exceed the magnitude threshold: generating the inference using the data set.

Performing the action set may also include: in a second instance of the third determination in which the magnitude of impact of potential inferences derived from the data set does not exceed the magnitude threshold: making a fictitious verification attempt for the data source; and generating an inference using the data set.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

In general, embodiments disclosed herein may provide methods, systems, and/or devices for managing AI models. The AI models may be managed in a manner that allows for malicious attacks (via the introduction of poisoned data sets as training data for the AI models) to be detected and intercepted prior to re-training the AI models. By doing so, the system may be more likely to be able to provide desired computer-implemented services due to the conservation of computing resources and the reduction of downtime of the AI model (e.g., time when the AI model is not generating inferences).

To detect and intercept malicious attacks, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, and/or (vii) generate snapshots for the AI model as it is updated over time.

To determine whether the AI model should be updated, risk associated with a data set and a data source from which the data set was obtained may be analyzed. To analyze the risk, a risk analysis may be performed. The risk analysis may generate a result indicating a severity level of risk and a magnitude of impact of potential inferences derived from the data set. The severity level of risk may be based, at least in part, on a location of the data source and/or other data (e.g., a historical data pattern of data obtained from the data source). If the severity level of risk exceeds a re-training risk threshold, the AI model may not be updated. If the severity level of risk does not exceed the re-training risk threshold, the AI model may be updated.

In the event that the AI model is not updated, the AI model manager 104 may determine whether to generate inferences using the data set based on the severity level of risk and the magnitude of impact of potential inferences derived from the data set. If the severity level of risk exceeds an inference risk threshold, the data may be discarded, and no inferences may be generated. If the severity level of risk does not exceed the inference risk threshold, AI model manager 104 may determine whether the magnitude of impact of potential inferences derived from the data set exceeds a magnitude threshold. If the magnitude of impact of potential inferences derived from the data set exceeds the magnitude threshold, AI model manager 104 may attempt to authenticate the data source (e.g., by requesting an authentication factor, etc.). If the authentication is successful, the data set may be used to generate inferences and the inferences may be provided to a downstream consumer. To prevent potential attackers from learning characteristics of data sets that trigger re-training, AI model manager 104 may issue a request for an authentication factor from the data source even if the magnitude of impact of potential inferences derived from the data set is within the magnitude threshold.

By doing so, re-training the AI model using poisoned training data may be prevented. Consequently, computing resources that would be required for re-training may be conserved and, if remediating the impact of poisoned training data causes the AI model to cease inference generation for a period of time, downtime of the AI model may be reduced. In addition, evaluating whether to generate inferences using the data set may prevent poisoned inferences with the potential to have a significant impact on the downstream consumer from reaching the downstream consumer. However, if poisoned training data is used to re-train the inference model, actions may be taken to remediate the situation using snapshots of the AI model as described below.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot, data values from a training data set used to generate the snapshot through re-training a prior instance of the AI model, etc.). Using incremental snapshots may improve efficiency as they may use fewer computing resources (e.g., data transfer and/or data storage) than a full snapshot. Generating snapshots of the AI model over time may allow for the impact of poisoned data to be computationally efficiently mitigated.

To mitigate the impact of poisoned data, AI model manager 104 may obtain a poisoned data notification. When a poisoned data notification is identified, AI model manager may use the snapshots to (i) revert an existing AI model instance to a previous AI model instance that is not tainted by the poisoned data, (ii) update the previous AI model instance to obtain an updated AI model instance that is not tainted by the poisoned data, (iii) identify poisoned inferences provided by the existing AI model inference (and/or previous versions that were also tainted by the poisoned data), (iv) obtain replacement inferences using the updated AI model instance, (v) delete the identified poisoned inferences, and/or (vi) notify inference consumers 102 of the poisoned inferences.

By doing so, embodiments disclosed herein may reduce inference supply interruptions to inference consumers 102 by reducing computing resources used for retraining poisoned AI models.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person who has already been identified by a user. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of the same person not identified by a user. An inference (e.g., an identification of the person) may be obtained from the trained instance of the AI model after ingesting the ingest dataset, and the inference may be distributed to inference consumers 102.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3D.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned training data used to train AI models. The following operations described in FIGS. 2A-2D may be performed by the system in FIG. 1 when providing this functionality.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume facial recognition services for images or video of an unidentified person. Facial recognition services may be provided by using AI models that have been trained to identify a person based on facial attributes.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of facial recognition, training data repository 200 may include images or video of a person who has already been identified by a user. The relationship between the images or video and the identification may be a portion of labeled data. Any of the training datasets (e.g., 200A) from training data repository 200 may relate the facial attributes of a person to their identifier (e.g., name, username, etc.) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the facial recognition services example, ingest data 202 may include images of an unidentified person. Ingest data 202 may be used by AI model manager 104 to obtain the name of the unidentified person (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the facial recognition services example, trained AI model 208 may be a trained facial recognition AI model, trained to map the facial attributes captured in images of a person to the name of the person.

To provide facial recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the facial recognition example, an image of an unidentified person may be input to the trained facial recognition AI model, the name of the unidentified person may be obtained by AI model manager 104, and the name of the unidentified person may be provided to an inference consumer such as a law enforcement agency.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance.

Thus, as illustrated in FIG. 2A, the system of FIG. 1 may provide inferences using trained AI models. However, as noted above, if the trained AI models are poisoned then the trained AI models may no longer be trustworthy for inference generation. To avoid poisoning of AI models, the system of FIG. 1 may analyze the risk associated with a data set and the data source from which the data set was obtained prior to using the data set to re-train the AI model.

Figure 2B:
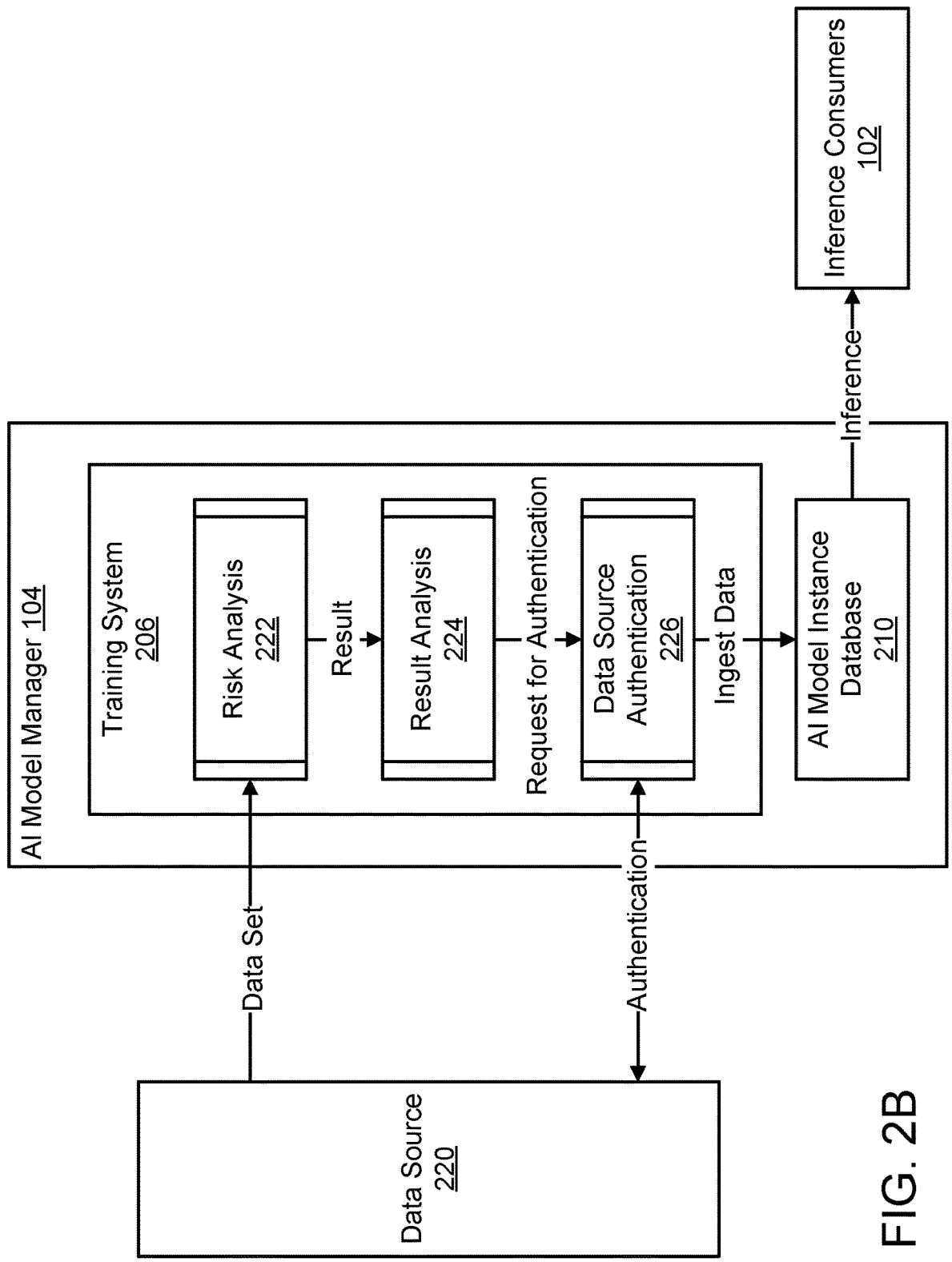
FIG. 2B shows a data flow diagram illustrating an AI model management system evaluating risk associated with a data source in accordance with an embodiment.

Turning to FIG. 2B, if re-training of the AI model is triggered (e.g., due to a time duration passing, inferences with low accuracy being obtained, and/or other conditions being met), training system 206 may obtain a data set from data source 220. Data source 220 may be similar to any of data sources 100. The data set may include any quantity or type of data usable to re-train an AI model and/or as ingest for a trained AI model to generate inferences. Training system 206 may perform risk analysis process 222 using the data set to obtain a result. Risk analysis process 222 may include: (i) identifying a location of data source 220, (ii) identifying a historical data pattern associated with data source 220, (iii) obtaining a severity level of risk associated with the data set, and (iv) obtaining a magnitude of potential impact of inferences derived from the data set. Refer to FIG. 3B for additional details regarding analyzing risk.

The result of risk analysis process 222 may be used for result analysis process 224. Result analysis process 224 may include comparing the severity level of risk indicated by the result to a re-training risk threshold. If the severity level of risk exceeds the re-training risk threshold, the data set may not be used as training data. In FIG. 2B, the severity level of risk exceeds the re-training threshold. Therefore, result analysis process 224 may indicate that the data set may not be utilized as a training data set.

Following the determination that the data set may not be used as a training data set, result analysis process 224 may also include determining whether the data set should be used for inference generation. To do so, training system 206 may compare the severity level of risk to an inference risk threshold. If the severity level of risk exceeds the inference risk threshold, the data set may be discarded and not used to generate inferences. If the severity level of risk does not exceed the inference risk threshold, training system 206 may compare the magnitude of impact of the potential inferences derived from the data set to a magnitude threshold. In FIG. 2B, the magnitude of impact of potential inferences derived from the data set exceeds the magnitude threshold, and training system 206 may generate a request for verification. The request for verification may initiate data source authentication process 226.

Data source authentication process 226 may include: (i) requesting an authentication factor from data source 220, (ii) receiving a response from data source 220, and (iii) determining whether the response fulfills the authentication factor request. The authentication factor may be a password, a pin, a biometric factor, etc. If the response fulfills the authentication factor request, authentication off data source 220 is successful. The data set may then be treated as ingest data and transmitted to AI model instance database 210 for inference generation. An instance of a trained AI model stored in AI model instance database 210 may generate an inference and transmit the inference to inference consumers 102.

In the event that an AI model is re-trained using poisoned training data, AI model manager 104 may manage inference generation to remediate the poisoned AI model. To manage inference generation when poisoned trained AI models are identified, the snapshots of snapshot database 212 (shown in FIG. 2A) may be used to computationally efficiently restore inference generation functionality, manage tainted inferences, and/or otherwise mitigate the impact of poisoned training data.

Figure 2C:
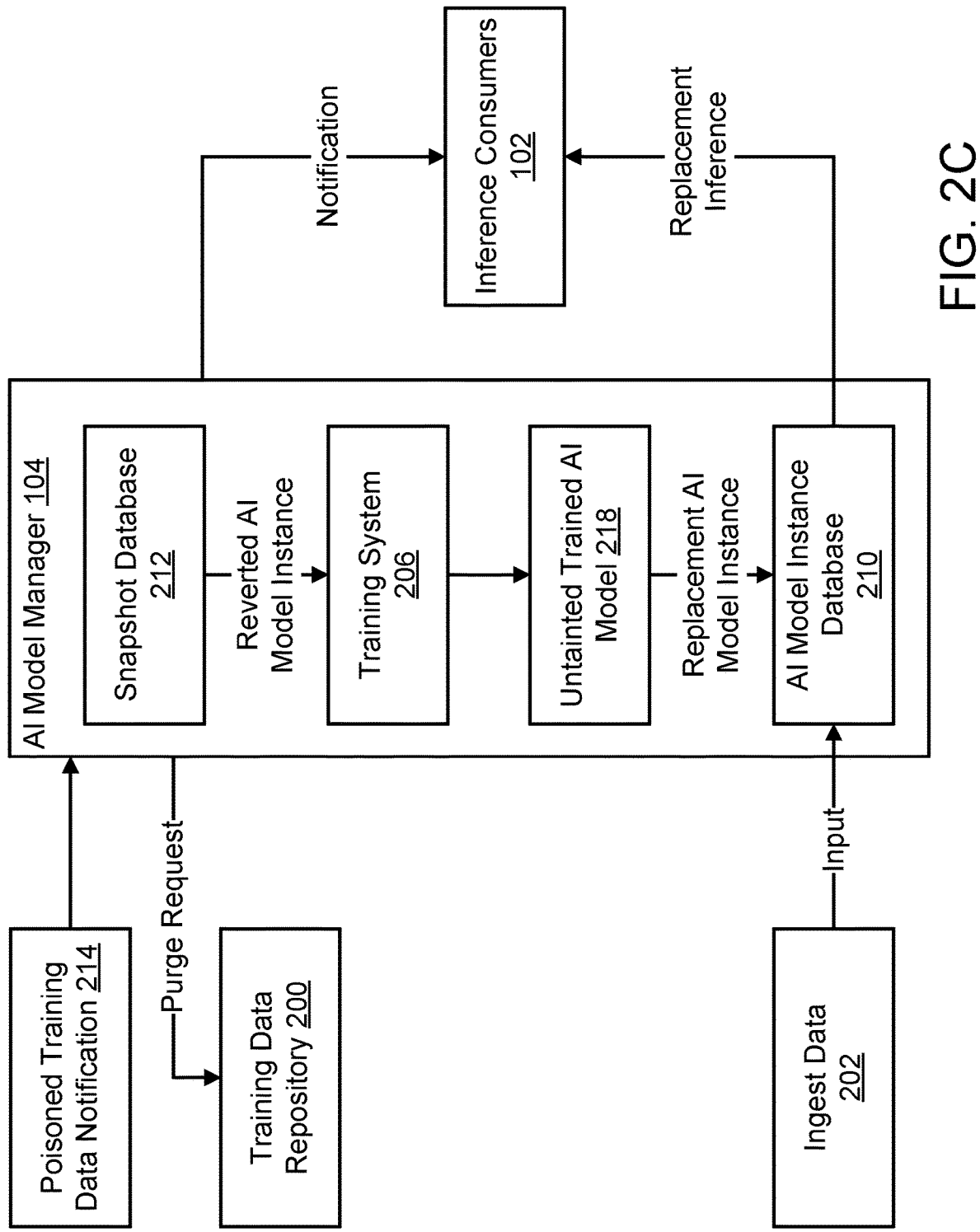
FIG. 2C shows a data flow diagram illustrating an AI model management system managing poisoned training data in accordance with an embodiment.

Turning to FIG. 2C, in the event that a poisoned training dataset is identified, AI model manager 104 may obtain poisoned training data notification 214. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a poisoned inference associated with the tainted AI model instance, (iv) a time period associated with the poisoning (e.g., the time when the poisoned training data is introduced to the AI model, and/or the time the poisoning is remediated), and/or (v) a data source 100 that supplied the poisoned training data.

For example, in the context of facial recognition services, a poisoned portion of a training dataset may include one or more forged images of a person that have been altered (e.g., to include characteristics of a bird). In this example, a forged image may be referred to as a "bad image." Training a facial recognition AI model using one or more bad images may result in a tainted facial recognition AI model that misclassifies ingested data (e.g., a picture of a bird) as being associated with the person pictured in the initially forged image. Therefore, the tainted facial recognition AI model may generate a poisoned inference that leads to an incorrect identification of a bird as a person depicted in a video.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model) if no action is taken to remediate the impact of the poisoned training data. The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2D. Updated training data repository 216 may not include any portions of poisoned training data. An updated training dataset from updated training data repository 216 may be used to train an untainted AI model instance that is trustworthy for inference generation.

Figure 2D:
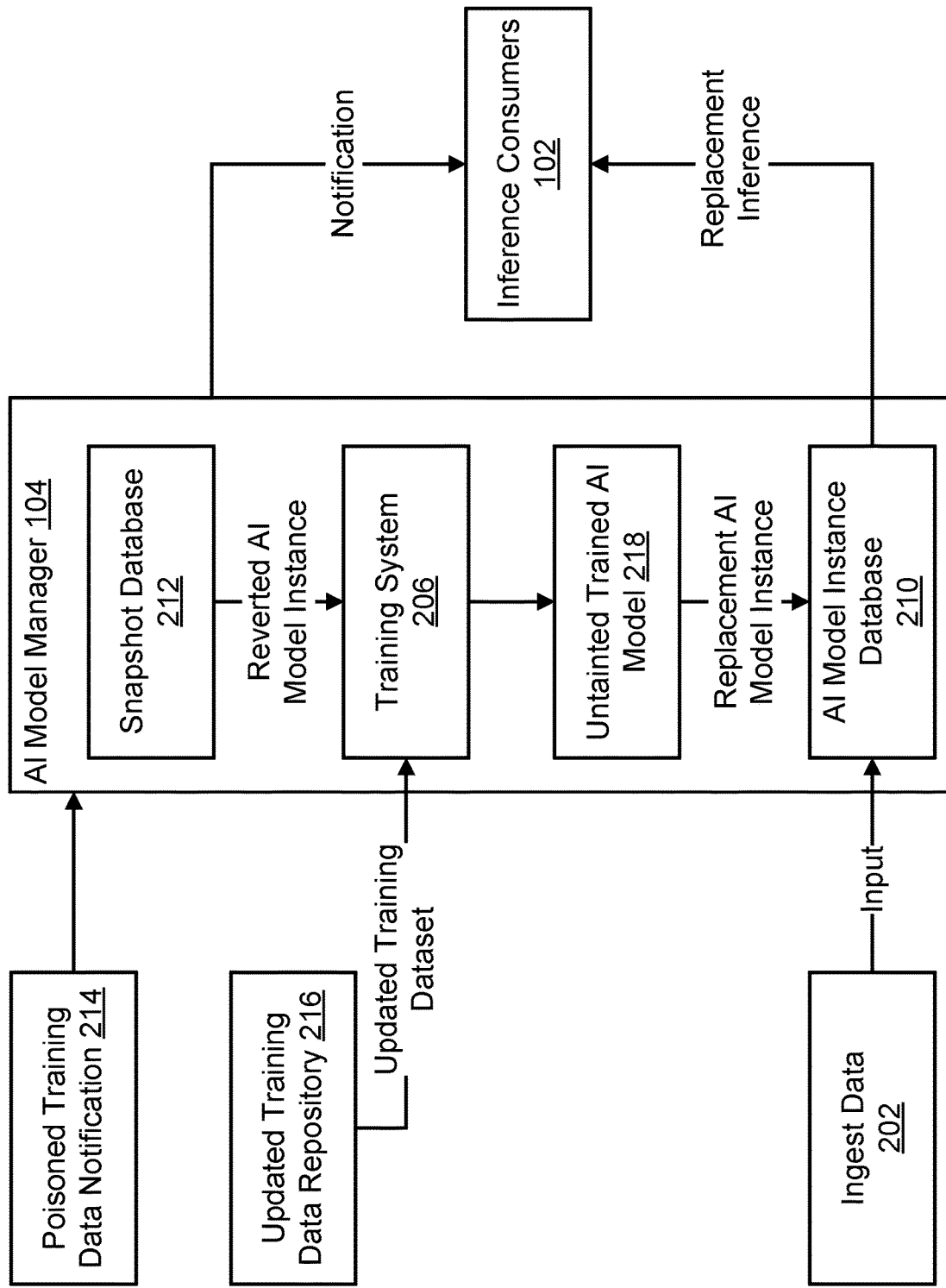
FIG. 2D shows a data flow diagram illustrating an AI model management system managing and remediating poisoned training data in accordance with an embodiment.

Keeping with FIG. 2D, to obtain untainted trained AI model 218, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the facial recognition services example, AI model manager 104 may send a notification to law enforcement (e.g., an inference consumer) regarding the incorrect identification of the person, and training data repository 200 may be updated by removing the one or more bad images. Consequently, updated training data repository 216 may be used to train a reverted facial recognition AI model (e.g., a last known good facial recognition AI model) without the impact of the poisoned training data. The reverted facial recognition AI model may be trained using only the portion of images and/or video from the updated training data repository that have not been previously used to update the reverted facial recognition AI model. Once trained, the untainted facial recognition AI model may ingest the video depicting the person and send an updated identification to law enforcement.

While a facial recognition service example is supplied to help describe FIGS. 2A-2D, it should be appreciated that the data flows illustrating AI model management in FIGS. 2A-2D may be used to achieve other types of goals without departing from embodiments disclosed herein.

As discussed above, the components of FIG. 1 may perform various methods to manage AI models. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Figure 3A:
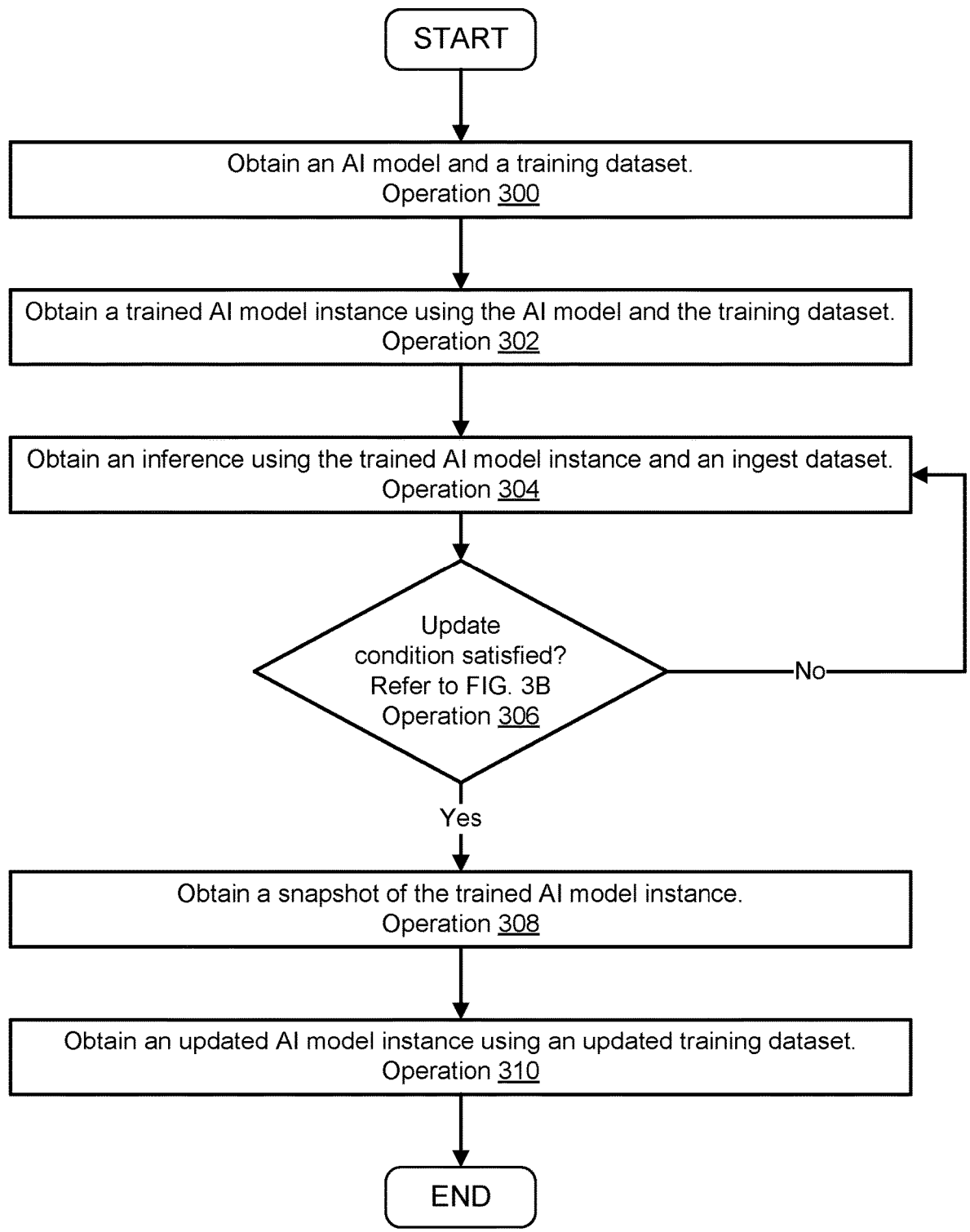
FIG. 3A shows a flow diagram illustrating a method of updating an AI model instance in accordance with an embodiment.
Figure 3B:
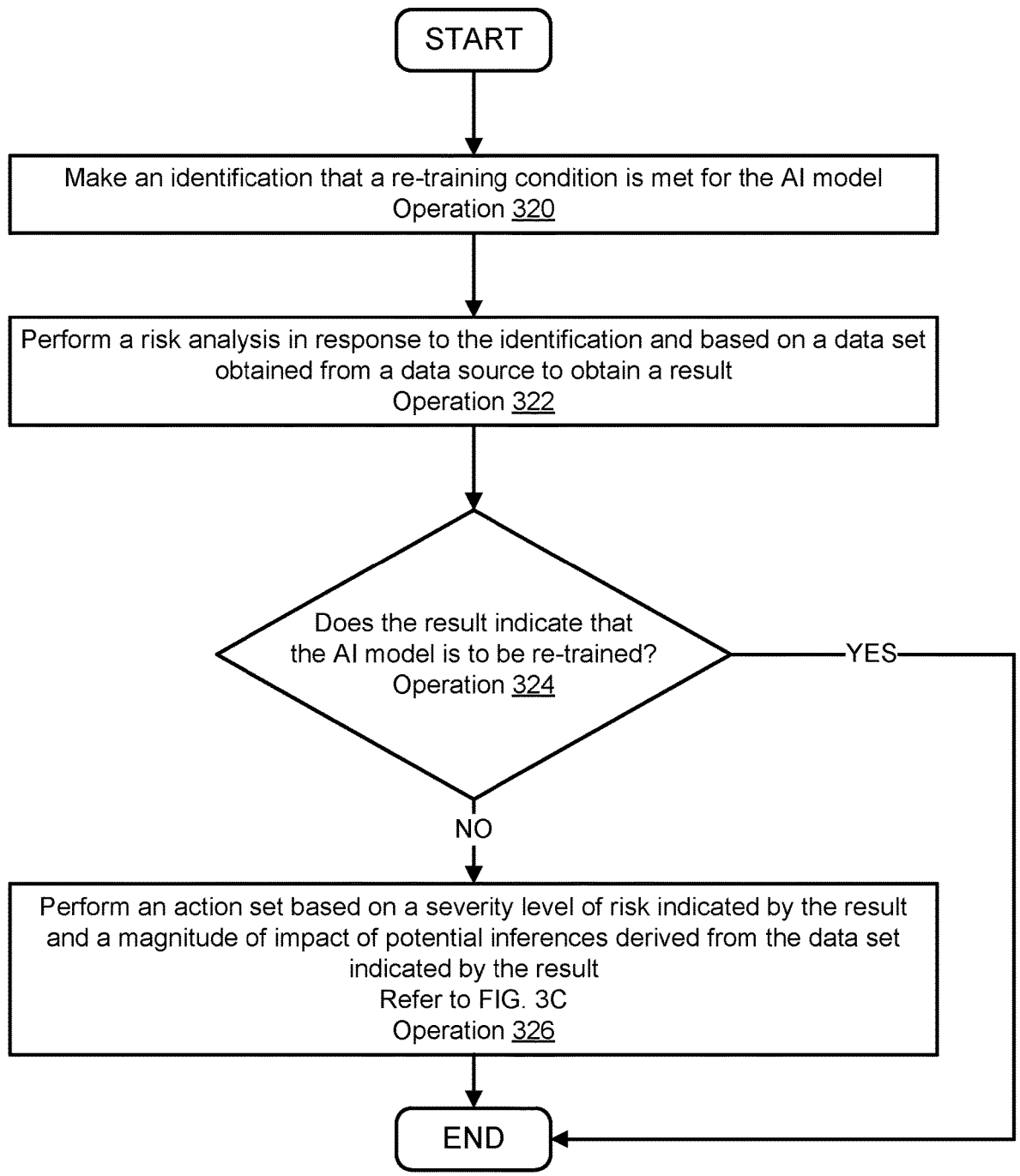
FIG. 3B shows a flow diagram illustrating a method of detecting a malicious attack targeting an AI model in accordance with an embodiment.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2E. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

Figure 3C:
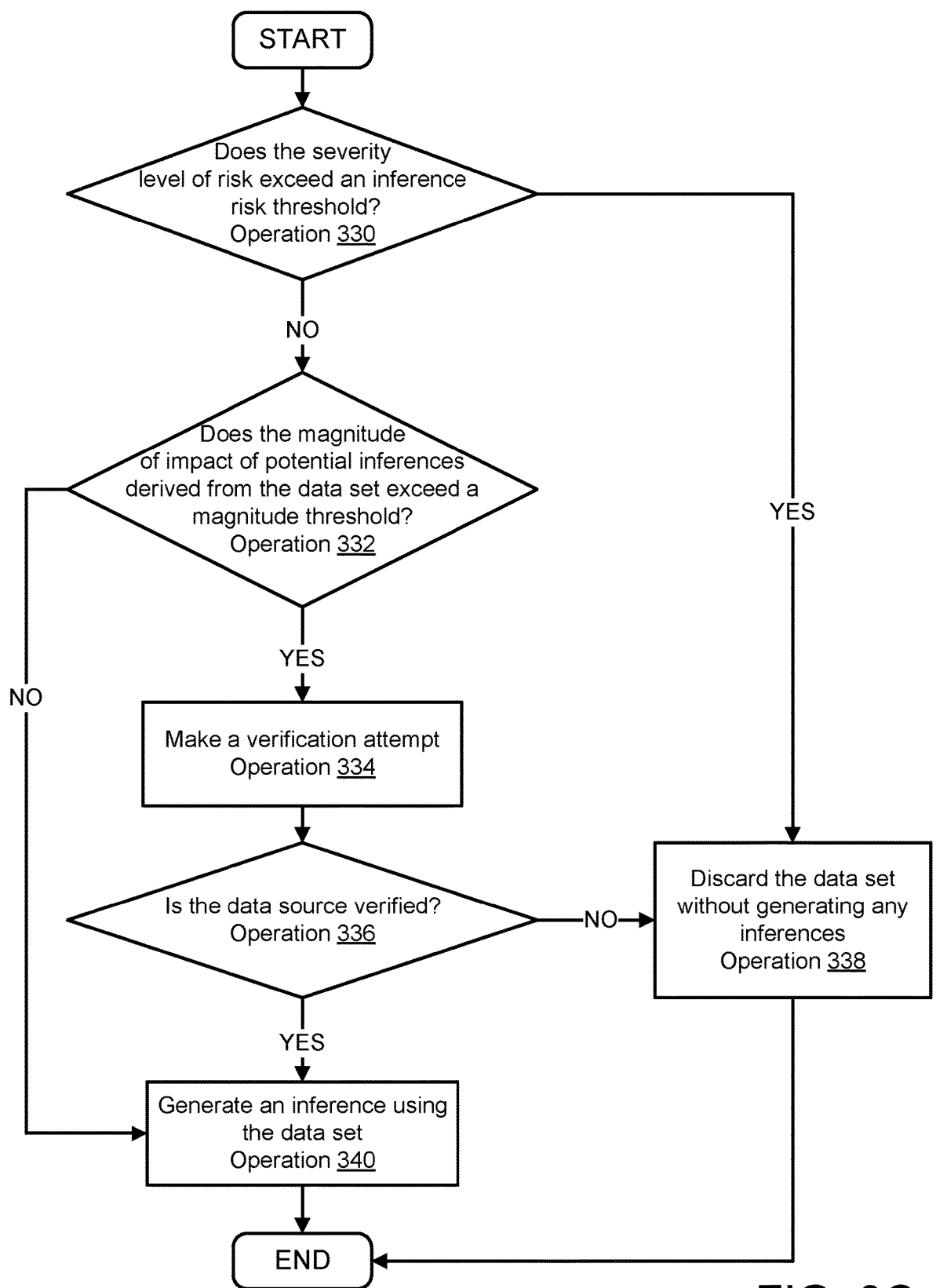
FIG. 3C shows a flow diagram illustrating a method of responding to a malicious attack targeting an AI model in accordance with an embodiment.

For example, the update condition may be satisfied if (i) a severity level of risk associated with the data obtained from a data source is within a re-training risk threshold. Refer to FIG. 3C for additional information regarding satisfying the update condition.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing an identifier for an input used to obtain the inference, an identifier for the inference, identification information for the inference consumer, and/or a time stamp indicating when the inference was generated. Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of detecting malicious attacks targeting an AI model in accordance with an embodiment is shown. The operations shown in FIG. 3B may be an expansion of operation 306 in FIG. 3A. The operations shown in FIG. 3B may be performed by AI model manager 104, data sources 100, inference consumers 102, and/or any other entity without departing from embodiments disclosed herein.

At operation 320, an identification is made that a re-training condition is met for the AI model. The identification may be made by evaluating characteristics of data sets obtained from data sources (e.g., data sources 100), characteristics of the inferences generated by the AI model, and or other data and determining that the data meets certain criteria. The identification may also be made by receiving a request for re-training.

For example, the re-training condition may be met if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), (iv) other basis of comparison between the current characteristics of the AI model, training data, and/or (v) if dictated by regulation, etc.

At operation 322, a risk analysis is performed in response to the identification and based on a data set obtained from a data source to obtain a result. The risk analysis may be performed by (i) identifying a location of the data source and a historical data pattern associated with the data source, (ii) obtaining, based on the location and the historical data pattern, a severity level of risk, and (iii) obtaining the result based, at least in part, on the severity level of risk.

The location of the data source may be identified by obtaining an identifier associated with the data source from which the data was obtained (e.g., an IP address, a network server ID, etc.). The identifier may be obtained with the data set, may be obtained at regular intervals, and/or may be obtained following a request for the identifier from the data source.

The historical data pattern associated with the data source may be obtained by searching for historical data (e.g., past data obtained from the data source) associated with the data source. The historical data may be stored locally and/or may be requested from another entity storing the historical data. Any historical data associated with the data source may then be analyzed to obtain the historical data pattern (e.g., an expected trend in data obtained from the data source).

The severity level of risk may be obtained by classifying the location (e.g., as a known trustworthy location, an unknown location, a known untrustworthy location, or the like) and identifying the severity level of risk based on the classification. The location may be classified using a classification lookup table and the location as a key for the classification lookup table. The classification lookup table may include locations and classifications associated with the locations. A lookup process may be performed by inputting the location into the classification lookup table.

The location may be a known trustworthy location if the location is a previously authenticated location, a location from which data sets are frequently obtained, etc. If the location is classified as a known trustworthy location, the data set may be compared to the historical data pattern associated with the data source. If the data set is in disagreement with the historical data pattern (e.g., to an extend specified by a threshold), the severity level of risk of the data source may be increased.

The location may be an unknown location if data sets have not been obtained from the location previously. If the location is classified as an unknown location, the severity level of risk may be increased.

The location may be a known untrustworthy location if external information indicates that the location is known to be suspicious and/or previously generate suspicious data. If the location is classified as a known untrustworthy location, the severity level of risk may be increased.

The severity level of risk may be obtained by inputting factors associated with the risk (e.g., classification of location, extent of agreement with historical data patterns, or the like) into a risk inference model trained to predict a severity level of risk using the factors described above as ingest. The risk inference model may be trained using risk training data (e.g., a labeled data set including factors associated with data sources and the severity level of risk of each of the data sources). The severity level of risk may be obtained via other methods (e.g., a risk lookup table, etc.) without departing from embodiments disclosed herein.

At operation 324, it is determined whether the result indicates that the AI model is to be re-trained. The determination may be made by comparing the severity level of risk to a re-training risk threshold. The re-training risk threshold may indicate an acceptable level of risk associated with a data source for re-training the AI model. If the severity level of risk exceeds the re-training risk threshold, the AI model may not be re-trained and the method may proceed to operation 326. If the severity level of risk does not exceed the re-training risk threshold, the AI model may be re-trained and the method may end following operation 324.

At operation 326, an action set is performed based on a severity level of risk indicated by the result and a magnitude of impact of potential inferences derived from the data set indicated by the result. Performing the action set may include determining whether to provide a downstream consumer with inferences generated using the data set as ingest for an AI model. To determine whether to generate inferences using the data set, the severity level of risk and the magnitude of impact of potential inferences derived from the data set may be compared to a series of thresholds. Refer to FIG. 3C for additional details regarding performing the action set.

The method may end following operation 326.

Turning to FIG. 3C, a flow diagram illustrating a method of responding to a malicious attack targeting an AI model in accordance with an embodiment is shown. The operations in FIG. 3C may be an expansion of operation 326 in FIG. 3B. The method may be performed by AI model manager 104, data sources 100, inference consumers 102, and/or any other entity without departing from embodiments disclosed herein.

At operation 330, it is determined whether the severity level of risk exceeds an inference risk threshold. The determination may be made by comparing the severity level of risk to the inference risk threshold. The inference risk threshold may indicate an acceptable level of risk associated with generating an inference using the data set. If the severity level of risk exceeds the inference risk threshold, the method may proceed to operation 338. If the severity level of risk does not exceed the inference risk threshold, the method may proceed to operation 332.

At operation 332, it is determined whether the magnitude of impact of potential inferences derived from the data set exceeds a magnitude threshold. The determination may be made by: (i) obtaining the magnitude of impact of potential inferences derived from the data set, and (ii) comparing the magnitude of impact of potential inferences derived from the data set to the magnitude threshold.

The magnitude of impact of potential inferences derived from the data set may be obtained by determining whether the data set includes a hard example. To determine whether the data set includes a hard example, the data set may be treated as ingest for an AI model. The AI model may generate: (i) inferences based on these examples as part of the learning process (e.g., active learning) and (ii) a confidence score associated for each generated inference. The confidence score of an inference may represent the likelihood that (i) the inference is correct, and/or (ii) the inference will satisfy an inference consumer's requirements.

Examples associated with lower confidence scores may be referred to as "hard examples," whereas higher confidence scores may be referred to as "easy examples." A score threshold may be specified to categorize examples. For example, a confidence score inferior to the score threshold may indicate the example is a hard example.

If the data set includes a hard example, the magnitude of impact of potential inferences derived from the data set may exceed the magnitude threshold and the method may proceed to operation 334. If the data set does not include a hard example, the magnitude of impact of potential inferences derived from the data set may not exceed the magnitude threshold and the method may proceed to operation 340.

At operation 334, a verification attempt is made. The verification attempt may be made by requesting an authentication factor from the data source and attempting to obtain a response from the data source. The authentication factor may include any authentication factor (e.g., a password, a pin, a biometric signature, etc.).

At operation 336 it may be determined whether the data source is verified. To do so, the response received from the data source may be compared to a previously known authentication factor (e.g., in storage). If the response fulfills the previously known authentication factor, the verification attempt may be successful, and the method may proceed to operation 340. If the response does not fulfil the previously known authentication factor, the verification attempt may be unsuccessful and the method may proceed to operation 338.

A fictitious verification attempt (not shown) may be made when the magnitude of impact of potential inferences derived from the data set does not exceed the magnitude threshold. The fictitious verification attempt may be intended to impede a malicious attacker from learning characteristics of data sets that include hard examples and/or initiate re-training of an AI model. The fictitious verification attempt may be made by transmitting a request for the authentication factor to the data source and attempting to obtain the response from the data source. Following the fictitious verification attempt, the method may proceed to operation 340 without verifying the data source.

At operation 340, an inference is generated using the data set. The inference may be generated by treating the data set as ingest for a trained AI model and feeding the ingest into the AI model to generate inferences as the output of the AI model. The inference may be transmitted to a downstream consumer and/or utilized for other purposes.

The method may end following operation 340.

Returning to operation 336, the method may proceed to operation 338 the data source is not verified. In addition, returning to operation 330, the method may proceed to operation 338 if the severity level of risk exceeds an inference risk threshold.

At operation 338, the data set is discarded without generating any inferences. The data set may be discarded by removing all instances of the data set from storage. Discarding the data set may also include generating a new entry in the classification lookup table (described in FIG. 3B) to label the data source as a known untrustworthy source.

The method may end following operation 338.

While attempts may be made to prevent introduction and use of poisoned training data, in some cases poisoned training data may be used resulting in various inference models becoming tainted and/or poisoned inferences generated by the tainted inference models may be used by downstream consumer. To address scenarios in which poisoned training data is used, the system may perform remediation processes to limit the impact of the poisoned training data.

Figure 3D:
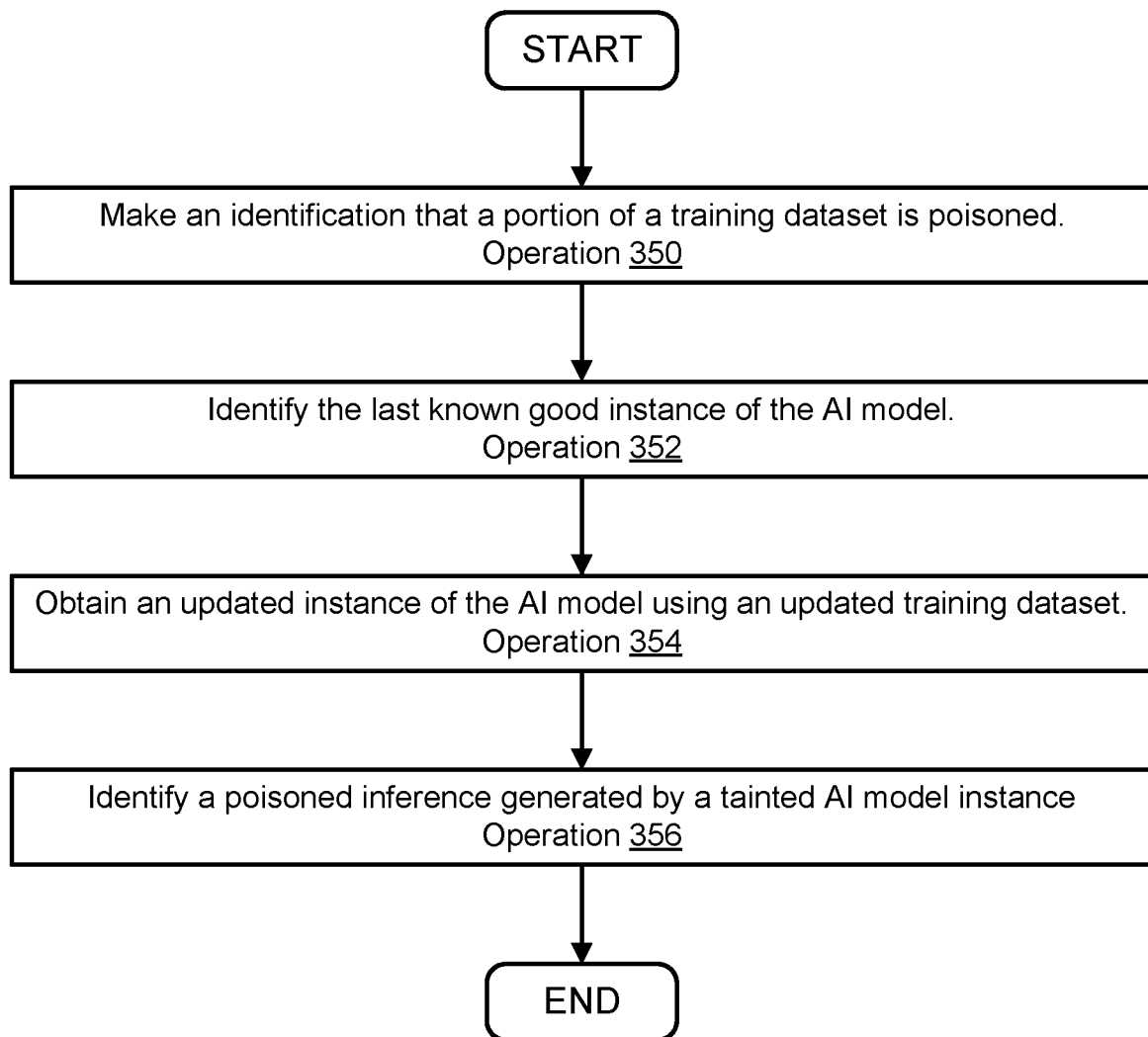
FIG. 3D shows a flow diagram illustrating a method of managing poisoned training data in accordance with an embodiment.

Turning to FIG. 3D, a flow diagram illustrating a method of managing poisoned training data in accordance with an embodiment is shown. The method may be performed by a data processing system, and/or another device.

At operation 350, an identification is made that a portion of a training dataset is poisoned. The identification may be made by (i) receiving the identification from another entity, (ii) reading the identification from storage, and/or (iv) generating the identification. The identification may be generated, for example, by performing various analysis of training data and/or operation of entities from which the training data may be obtained. The portion of the poisoned training data may have already been used to train an AI model, in contrast to the training data discussed with respect to FIGS. 3B-3C.

At operation 352, the last known good instance of the AI model is identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model is obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference is identified. The poisoned inference may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Figure 4:
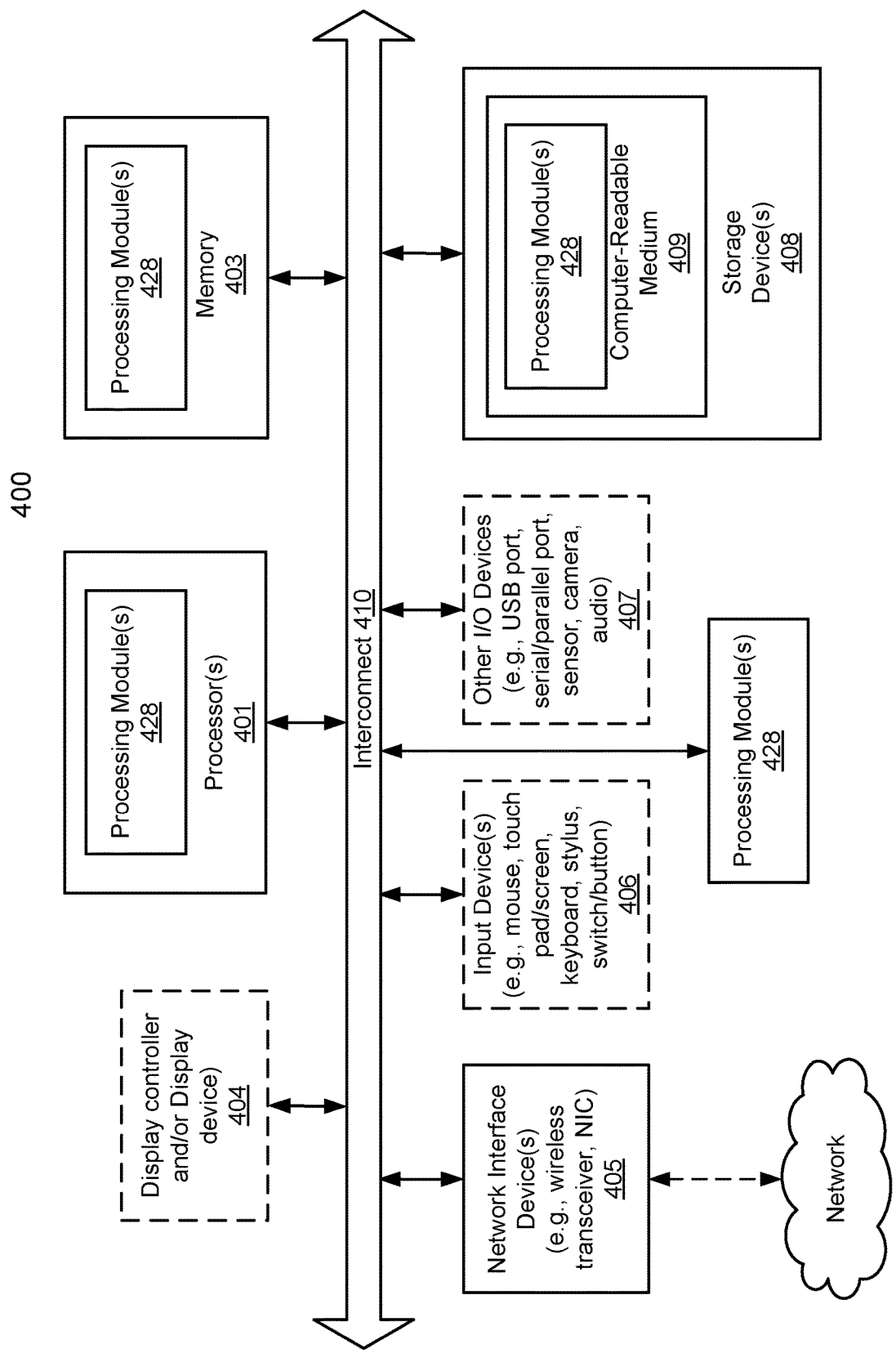
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of detecting malicious attacks targeting an artificial intelligence (AI) model, the method comprising:
   making an identification that a re-training condition is met for the AI model;
   in response to the identification, performing a risk analysis based on a data set obtained from a data source to obtain a result comprising a severity level of risk;
   making a first determination regarding whether to re-train the AI model using the data set based on the result; and
   in an instance of the first determination in which the AI model is not to be re-trained using the data set:
   performing an action set based on:
   the severity level of risk of the result; and
   a magnitude of impact of potential inferences derived from the data set indicated by the result.

2. The method of claim 1, wherein performing the risk analysis comprises:
   identifying a location of the data source and a historical data pattern associated with the data source;
   obtaining, based on the location and the historical data pattern, the severity level of risk; and
   obtaining the result based, at least in part, on the severity level of risk.

3. The method of claim 2, wherein making the first determination comprises:
   making a first comparison of the severity level of risk to a re-training risk threshold;
   in a first instance of the first comparison where the severity level of risk exceeds the re-training risk threshold, electing not to re-train the AI model using the data set; and
   in a second instance of the first comparison where the severity level of risk does not exceed the re-training risk threshold, electing to re-train the AI model using the data set.

4. The method of claim 3, wherein obtaining the severity level of risk comprises:
   making a classification of the location as one selected from a group consisting of:
   a known trustworthy location;
   an unknown location; and
   a known untrustworthy location.

5. The method of claim 4, wherein obtaining the severity level of risk further comprises:
   in an instance of the classification where the location is the known trustworthy location:
   making a second comparison of the data set to the historical data pattern; and
   in an instance of the second comparison where the data set is in disagreement with the historical data pattern:
   increasing the severity level of the risk.

6. The method of claim 1, wherein performing the action set comprises:
   making a second determination regarding whether the severity level of risk exceeds an inference risk threshold; and
   in a first instance of the second determination where the severity level of risk exceeds the inference risk threshold:
   discarding the data set without generating any inferences.

7. The method of claim 6, wherein performing the action set further comprises:
   in a second instance of the second determination where the severity level of risk does not exceed the inference risk threshold:
   making a third determination regarding whether the magnitude of impact of potential inferences derived from the data set exceeds a magnitude threshold;
   in a first instance of the third determination in which the magnitude of impact of potential inferences derived from the data set exceeds the magnitude threshold:
   making a verification attempt for the data source;
   in a first instance of the verification attempt in which the data source is verified:
   generating an inference using the data set; and
   in a second instance of the verification attempt in which the data source is not verified:
   discarding the data set without generating any inferences.

8. The method of claim 7, wherein performing the action set further comprises:
   in a second instance of the third determination in which the magnitude of impact of potential inferences derived from the data set does not exceed the magnitude threshold:
   generating the inference using the data set.

9. The method of claim 7, wherein performing the action set further comprises:
   in a second instance of the third determination in which the magnitude of impact of potential inferences derived from the data set does not exceed the magnitude threshold:
   making a fictitious verification attempt for the data source; and
   generating an inference using the data set.

10. A non-transitory machine-readable medium having instructions stored therein, which when executed by a processor, cause the processor to perform operations for detecting malicious attacks targeting an artificial intelligence (AI) model, the operations comprising:
    making an identification that a re-training condition is met for the AI model;
    in response to the identification, performing a risk analysis based on a data set obtained from a data source to obtain a result comprising a severity level of risk;
    making a first determination regarding whether to re-train the AI model using the data set based on the result; and
    in an instance of the first determination in which the AI model is not to be re-trained using the data set:
    performing an action set based on:
    the severity level of risk of the result; and
    a magnitude of impact of potential inferences derived from the data set indicated by the result.

11. The non-transitory machine-readable medium of claim 10, wherein performing the risk analysis comprises:

identifying a location of the data source and a historical data pattern associated with the data source;

obtaining, based on the location and the historical data pattern, the severity level of risk; and obtaining the result based, at least in part, on the severity level of risk.

12. The non-transitory machine-readable medium of claim 11, wherein making the first determination comprises:

making a first comparison of the severity level of risk to a re-training risk threshold;

in a first instance of the first comparison where the severity level of risk exceeds the re-training risk threshold, electing not to re-train the AI model using the data set; and in a second instance of the first comparison where the severity level of risk does not exceed the re-training risk threshold, electing to re-train the AI model using the data set.

13. The non-transitory machine-readable medium of claim 12, wherein obtaining the severity level of risk comprises:

making a classification of the location as one selected from a group consisting of:
a known trustworthy location;
an unknown location; and
a known untrustworthy location.

14. The non-transitory machine-readable medium of claim 13, wherein obtaining the severity level of risk further comprises:

in an instance of the classification where the location is the known trustworthy location:
making a second comparison of the data set to the historical data pattern;
in an instance of the second comparison where the data set is in disagreement with the historical data pattern:
increasing the severity level of the risk.

15. The non-transitory machine-readable medium of claim 10, wherein performing the action set comprises:

making a second determination regarding whether the severity level of risk exceeds an inference risk threshold; and in a first instance of the second determination where the severity level of risk exceeds the inference risk threshold:
discarding the data set without generating any inferences.

16. A data processing system, comprising:
a processor; and
a memory coupled to the processor to store instructions, which when executed by the processor, cause the processor to perform operations for detecting malicious attacks targeting an artificial intelligence (AI) model, the operations comprising:

making an identification that a re-training condition is met for the AI model;

in response to the identification, performing a risk analysis based on a data set obtained from a data source to obtain a result comprising a severity level of risk;

making a first determination regarding whether to re-train the AI model using the data set based on the result; and in an instance of the first determination in which the AI model is not to be re-trained using the data set:
performing an action set based on:
the severity level of risk of the result; and
a magnitude of impact of potential inferences derived from the data set indicated by the result.

17. The data processing system of claim 16, wherein performing the risk analysis comprises:

identifying a location of the data source and a historical data pattern associated with the data source;

obtaining, based on the location and the historical data pattern, the severity level of risk; and obtaining the result based, at least in part, on the severity level of risk.

18. The data processing system of claim 17, wherein making the first determination comprises:

making a first comparison of the severity level of risk to a re-training risk threshold;

in a first instance of the first comparison where the severity level of risk exceeds the re-training risk threshold, electing not to re-train the AI model using the data set; and in a second instance of the first comparison where the severity level of risk does not exceed the re-training risk threshold, electing to re-train the AI model using the data set.

19. The data processing system of claim 18, wherein obtaining the severity level of risk comprises:

making a classification of the location as one selected from a group consisting of:
a known trustworthy location;
an unknown location; and
a known untrustworthy location.

20. The data processing system of claim 19, wherein obtaining the severity level of risk further comprises:

in an instance of the classification where the location is the known trustworthy location:
making a second comparison of the data set to the historical data pattern;
in an instance of the second comparison where the data set is in disagreement with the historical data pattern:
increasing the severity level of the risk.

* * * * *